United States Patent [19]

Kämäräinen

[11] Patent Number: 4,710,060
[45] Date of Patent: Dec. 1, 1987

[54] WATER VESSELS OF THE FLOATING-DECK TYPE

[75] Inventor: Jorma Kämäräinen, Espoo, Finland

[73] Assignee: Valmet Oy, Finland

[21] Appl. No.: 858,946

[22] Filed: May 2, 1986

[30] Foreign Application Priority Data

May 8, 1985 [FI] Finland .................................. 851813

[51] Int. Cl.$^4$ .............................................. F16L 1/04
[52] U.S. Cl. .................................... 405/166; 114/125; 367/15; 405/158
[58] Field of Search .................... 367/15, 20; 114/244, 114/72, 73, 254; 405/158, 166, 167, 168, 201, 218, 219

[56] References Cited

U.S. PATENT DOCUMENTS

| | | | |
|---|---|---|---|
| 3,690,111 | 9/1972 | Matthews, Jr. ...................... | 405/166 |
| 3,704,596 | 12/1972 | Lloyd .................................. | 405/166 |
| 3,941,071 | 3/1976 | Aldecoa et al. ...................... | 114/73 |
| 4,401,398 | 8/1983 | Remson .............................. | 405/201 |
| 4,488,503 | 12/1984 | Galatis .............................. | 114/125 |
| 4,491,939 | 1/1985 | Carpenter .......................... | 367/20 |

FOREIGN PATENT DOCUMENTS 2107868  5/1983  United Kingdom .................. 367/15

OTHER PUBLICATIONS

Fjord Instruments A/S, brochure from S.E.G. conference, Washington, D.C., 10-9-85.
Fjord Instruments A/S, one page flyer on test-station, from S.E.G. conference, Washington, D.C., 10-9-85.

Primary Examiner—Dennis L. Taylor
Attorney, Agent, or Firm—Steinberg & Raskin

[57] ABSTRACT

A water vessel of the floating-dock type is provided with an arrangement for adapting the vessel for seismic or similar research. A platform is mounted above the cargo deck and extends between the side walls of the vessel. Research equipment including at least a measurement cable mounted on a reel is supported on the platform. The measurement cable is passed from the reel through the stern door of the vessel into the sea. Cables for transmitting impulses to be measured are situated within spaces provided within the side walls of the vessel so as to be lowerable into the sea from the stern ends of the side walls. According to one embodiment, the platform is mounted so as to be displaceable in the longitudinal direction of the vessel. By means of the invention, a vessel of the floating-dock type can be converted to a vessel suitable for research operations in an economical manner.

14 Claims, 4 Drawing Figures

WATER VESSELS OF THE FLOATING-DECK TYPE

BACKGROUND OF THE INVENTION

This invention relates generally to water vessels of the floating-dock type and, more particularly, to floating-dock type vessels which are adapted for seismic or like research.

Vessels of the floating-dock type are intended mainly for transporting floating cargo such, for example, as lighters and timber. Such vessels generally include a pair of spaced side walls, a cargo deck extending between the side walls defining a cargo space, and a door situated at the stern of the vessel. The loading of such vessels is normally performed through the stern door with the ship having been lowered by means of ballast to a suitable depth in the water whereby the cargo can be floated into or out from the cargo space. It is also possible to load ordinary, i.e. dry cargo such, for example, as containers and trailers into some vessels of this type by arranging the cargo in the conventional manner on the cargo deck of the ship. Vessels of the floating-dock type are normally quite large in order to provide adequate capacity for the transportation of lighters. In particularly, the length of such vessels is generally on the order of about 150 m so that such vessels remain quite steady even in rough seas.

On the other hand, vessels intended for seismic or hydrologic research are normally specialized vessels on which research equipment is normally permanently fixed so that such vessels generally cannot be used for any purpose other than research. Conventional research vessels are of a relatively small size, generally having a length on the order of about 50 m and for this reason research work generally cannot be carried out on such vessels in rough seas due to the consequent movement of such vessels.

SUMMARY OF THE INVENTION

It is an object of the present invention to provide an improvement in vessels of the floating-dock type which will render such vessels suitable for research operations.

Another object of the present invention is to provide an improvement in floating-dock type vessels which enable the conversion of such vessels to research vessels in an economical manner.

Briefly, in accordance with the present invention, these and other objects are attained by providing a conventional floating-dock type vessel with a platform situated above the cargo deck of the vessel and extending between the side walls thereof and on which research equipment including at least a measurement cable wound on a reel is supported. The measurement cable is arranged so as to pass from the reel through the stern door of the vessel into the sea. Spaces are provided within the side walls of the vessel in which cables for transmitting impulses to be measured are situated. The transmitter cables are arranged so as to be lowerable into the sea from the stern ends of the side walls.

Several important advantages are obtained by the present invention. For example, the invention enables the scope of use of floating-dock vessels to be extended. In particular, a vessel of the floating-dock type can be converted to a vessel which is suitable for research operations in an economical manner since it is no longer necessary to provide a special purpose vessel for the research operation. Rather, the research equipment is merely installed on an existing vessel of the floating-dock type. Another important advantage is that when a floating-dock vessel is provided with research equipment in accordance with the invention, the research work can be carried out even under rough sea conditions since the floating-dock vessel is significantly more steady in rough seas than the smaller, special purpose research vessels.

DETAILED DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
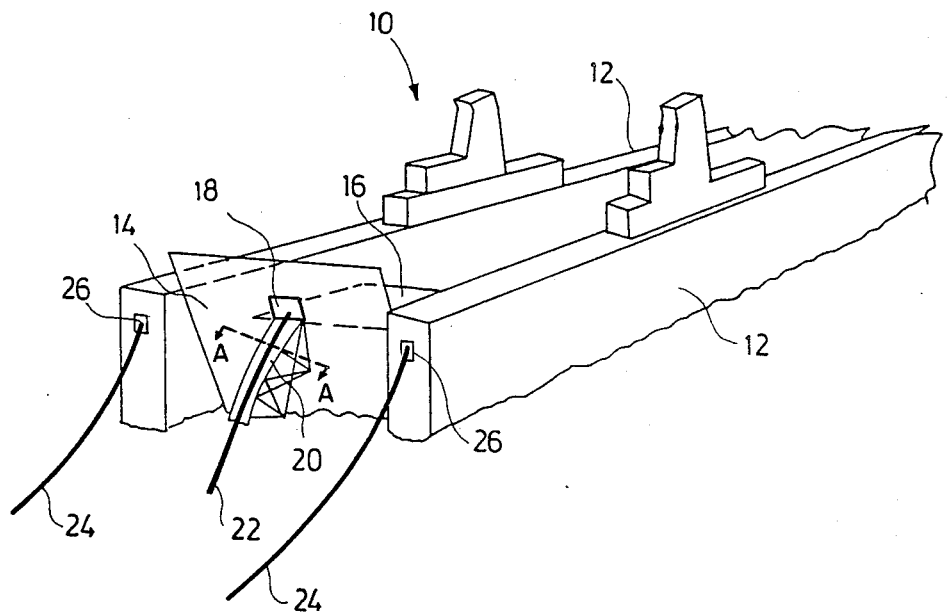
FIG. 1 is a schematic perspective view of an improved floating-dock type vessel in accordance with the invention.

Referring now to the drawings wherein like reference character designate identical or corresponding parts throughout the several views, a floating-dock type vessel provided with an improvement in accordance with the invention is illustrated in FIG. 1 and is generally designated 10. The vessel 10 includes a pair of side walls 12 having inner surfaces 12a. A cargo deck 13 (FIGS. 2 and 3) extends between the side walls 12 and defines a cargo space. A door 14 is situated at the stern of the vessel 10.

In accordance with the general aspects of the invention, an opening 18 is formed in the stern door 14 in connection with which a ramp 20 is provided. A platform 16 for supporting research equipment is mounted above the cargo deck and extends between the side walls 12. The vessel illustrated in the figures is intended for seismic research and a seismic "Streamer" cable 22 passes from the equipment platform 16 through the opening 18 provided in the stern door 14 into the sea. The seismic cable 22 is wound on a cable reel 32 which is installed on the platform 16 along with any other necessary auxiliary equipment. Transmitter cables 24 are fitted within spaces provided in the side walls 12 and openings 26 are provided at the stern ends of the side walls through which the transmitter cables 24 pass. The platform 16 is mounted on rails, guides or other similar attaching members 28 which are connected to the inner surfaces 12a of side walls 12. In accordance with the FIG. 2 embodiment, the platform 16 is arranged so as to be displaceable in the longitudinal direction of vessel 10 and towards this end, the platform 16 is provided with roller elements 30, such as wheels or rolls, on which the platform 16 can be displaced along the attachment members 28. The platform 16 can also be mounted in a stationary manner as shown in FIG. 3.

In accordance with the particular embodiments illustrated, the vessel 10 of the floating-dock type is equipped for seismic research with airgun, i.e. compressed air, cables 24 as well as with the seismic "Streamer" cable 22. The cables 22, 24 may be several thousand meters long. Seismic survey operations are normally carried out by the vessel 10 hauling the airgun cables 24 and seismic cable 22 behind it while compressed air is passed through the airgun cables 24 into discharge devices provided thereon from which the compressed air is released in accordance with a predetermined program so that as the compressed air is released, sound impulses are emitted into the water. The sound impulses progress through the water and are reflected from the various layers of the sea bottom in characteristic ways. The seismic cable 22 is, on the other hand, provided with receiver devices which receive and record sound impulses which are reflected from the layers of the sea bottom. The receiver devices, which may comprise hydrophones, transmit the reflected sound impulse information into a computer on board vessel 10 which records and analyzes the received information indicative of the different layers of the sea bottom.

Figure 1A:
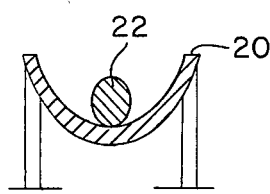
FIG. 1A is a section view taken along line A—A of FIG. 1.

As noted above, the airgun cables 24 are fitted within the side walls 12 of vessel 10 from where they are passed through openings 26 formed at the stern ends of the side walls 12. Preferably, conventional devices are also situated in the spaces within the side walls 12 for winding the airgun cables 24 into the side walls and for releasing the same into the sea during research operations. For seismic cable 22, the platform 16 is installed between the side walls 12 of the cargo deck, the seismic cable reel 32 being mounted on platform 16 onto which the seismic cable 22 can be wound and from which it can be released into the sea when a research operation, such as a survey, is being carried out. The seismic cable 22 passes through the opening 18 which is formed in the stern door 14 of vessel 10 as the cable is released into and withdrawn from the sea. A ramp 20 is installed on the outer surface of the stern door 14 in conjunction with opening 18 for facilitating a smooth lowering of the cable 22 into the sea . In particular, the ramp 20 ensures that the seismic cable 22 will not bend too sharply and that it will not rub against the edges of the opening 18. The ramp 20 extends in a gently downward curve from opening 18 towards the sea. The ramp 20 is preferably trough-shaped (FIG. 1A) in order to ensure that the cable 22 will not fall from the ramp.

Figure 3:
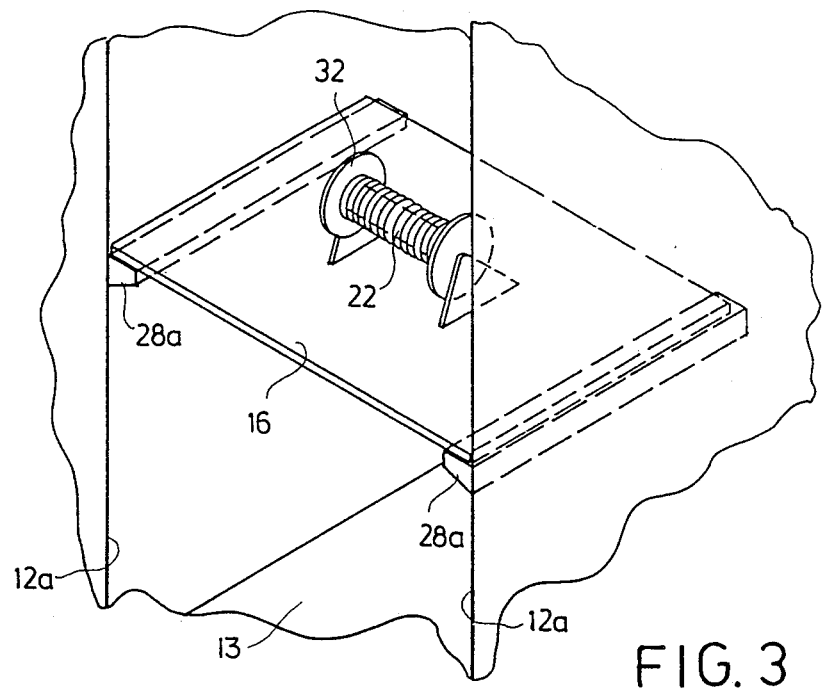
FIG. 3 is a schematic detail view in perspective of another embodiment of the invention.

Referring to the embodiment of FIG. 3, attachment members 28a are provided on the inner surfaces 12a of the side walls 12 for supportably mounting the platform 16. The platform 16 installed on attachment members 28a is stationary and in this case is arranged proximate to the stern door 14. The platform 16 may be lowered onto the attachment members 28a, such as by means of an external crane when the vessel 10 is being converted for research use. This arrangement wherein the platform 16 is mounted in a stationary manner on vessel 10 has the drawback, however, that the platform 16 may hamper or obstruct the loading of other cargo into the vessel 10. In some cases, it may even be necessary to detach the platform 16 in order to accommodate other cargo into the vessel 10.

Figure 2:
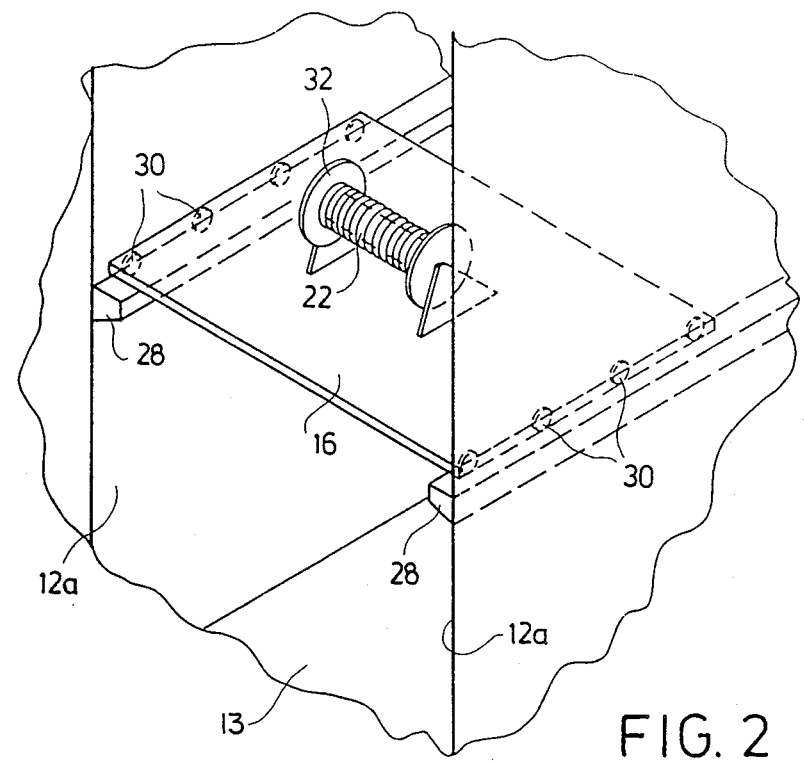
FIG. 2 is a schematic detail view in perspective of one embodiment of the invention.

For this reason, the embodiment illustrated in FIG. 2 may be considered preferable. In accordance with the embodiment of FIG. 2, the platform 16 is installed in a manner so as to be displaceable in the longitudinal direction of vessel 10. Rails or guides 28 are mounted on the inner surfaces 12a of the side side walls. The rails or guides 28 preferably extend over the entire length of the cargo space. The platform 16 is mounted on guides 28 by means of roller elements 30. In this manner, the platform 16 can be shifted in the longitudinal direction of vessel 10 along the rails or guides 28. The platform 16 is preferably provided with a motor or drive unit from which power is transmitted to at least one of the wheels or rollers 30 so that the platform 16 can be independently shifted in a longitudinal direction.

The reel 32 carrying the seismic cable 22 or "Streamer" is mounted on the platform 16. In addition to the reel 32, other equipment required during research, such as winches and the like, may also be mounted on platform 16. The equipment required for receiving and screening the data, such as computers, may be installed elsewhere in the vessel 10, if necessary.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In a water vessel of the floating-dock type which includes a pair of spaced side walls, a cargo deck extending between said side walls defining a cargo space, and a door situated at the stern of said vessel, an improvement for adapting the vessel for seismic or like research comprising:
   a platform for supporting research equipment mounted above siad cargo deck and extending between said side walls;
   research equipment including at least a measurement cable mounted on a reel, said research equipment supported on said platform;
   means for passing said measurement cable from said reel through said stern door into the sea;
   at least one of said side walls of vessel being provided with an interior space therewithin;
   a transmitter cable for generating an impulse to be measured situated in said interior space provided within a respective side wall; and
   means for passing said transmitter cable through a stern end of a respective side wall to lower said transmitter cable into the sea.

2. The combination of claim 1 further including means for mounting said platform so that said platform is displaceable in the longitudinal direction of said vessel.

3. The combination of claim 2 wherein said mounting means include guide rail means mounted on inner surfaces of said vessel side walls and wherein outer longitudinal edge regions of said platform are mounted on respective ones of said guide rail means whereby said platform is displaceable in the longitudinal direction of said vessel along said guide rail means.

4. The combination of claim 3 wherein said guide rail means extend substantially over the entire length of the cargo space in said vessel.

5. The combination of claim 1 further including means for stationarily mounting said platform proximate to said stern door.

6. The combination of claim 5 wherein said means for stationarily mounting said platform include attachment members substantially permanently mounted on inner surfaces of said vessel side walls.

7. The combination of claim 1 wherein said means for passing said measurement cable from said reel through said stern door into the sea include an opening formed in said stern door through which said measurement cable is arranged to pass from said reel into the sea.

8. The combination of claim 7 wherein said means for passing said measurement cable from said reel through said stern door into the sea further include ramp means for supporting said measurement cable, said ramp means having one end connected to an outer surface of said stern door proximate to said opening formed therein through which said transmitter cable passes and sloping gently downwardly from said opening.

9. The combination of claim 8 wherein said ramp means is trough-shaped.

10. The combination of claim 1 wherein an opening is formed at a stern end of a vessel side wall in which an interior space is provided within which a transmitter cable is situated, said transmitter cable passing through said opening to be lowered into and lifted out of the sea.

11. The combination of claim 1 wherein said platform is provided with roller means for mounting said platform on guide rail means so as to be displaceable therealong.

12. The combination of claim 11 further including power means for transmitting power to said roller means for displacing said platform.

13. The combination of claim 1 wherein said measurement cable comprises a seismic cable provided with hydrophones and wherein said transmitter cable comprises a compressed air cable.

14. The combination of claim 1 further including means for mounting said platform so that said platform is movable to a position remote from a postion above a region of said cargo deck above which said platform is normally located to allow cargo to be loaded onto said cargo deck region.

* * * * *